Aug. 14, 1923.
E. G. WILLEMS
CONCENTRATOR
Filed Nov. 11, 1920
1,464,793
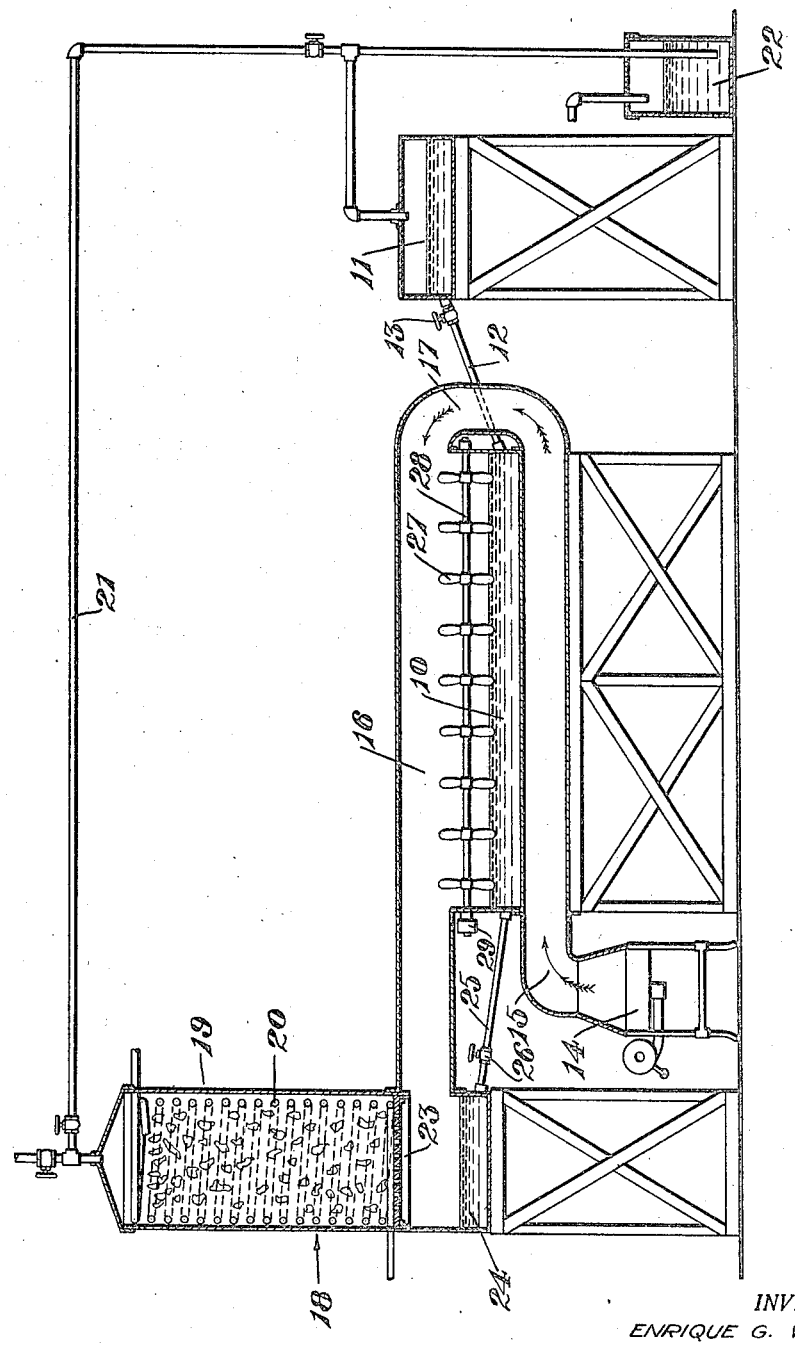
INVENTOR.
ENRIQUE G. WILLEMS.
BY Chas. E. Townsend
ATTORNEY Patented Aug. 14, 1923.

1,464,793

UNITED STATES PATENT OFFICE.

ENRIQUE G. WILLEMS, OF SANTIAGO, CHILE.

CONCENTRATOR.

Application filed November 11, 1920. Serial No. 423,281.

*To all whom it may concern:*

Be it known that ENRIQUE G. WILLEMS, citizen of Chile, residing at Santiago, Chile, has invented new and useful Improvements in Concentrators, of which the following is a specification.

This invention relates to a concentrator.

It is often desirable to concentrate liquids such as sulphuric acid, tannin, sugar and salt solutions. With this in view, it is the object of the present invention to provide an apparatus simple in construction and inexpensive as to operation by which sulphuric acid may be readily concentrated and reduced to any strength of concentration required.

The present invention contemplates the use of a vat into which liquid is delivered and thereafter agitated to produce a fine spray, and from which it may be carried by evaporation to thereafter be concentrated, and if desired, return to the vat for further concentration.

The invention is illustrated by way of example in the accompanying drawing, in which the figure shows one form of the invention in diagram.

Referring more particularly to the drawing, 10 indicates a vat within which the liquid to be concentrated is placed. This liquid is preferably conducted from a supply tank 11, through a pipe 12. The pipe is of course fitted with a valve 13, by which the flow may be interrupted or regulated.

The vat is disposed in the path of travel of heated air. This air may be directly conducted to the vat, or may be used to indirectly heat the vat prior to coming into intimate contact with the liquid. By way of example, a forge 14 is shown as a heat generating means. This forge is fired with smokeless fuel. Heated air from a furnace might also be used. The air and products of combustion from the forge are conducted through a flue 15 to a passage way 16 above the vat. In the present drawing, the flue is shown as extending horizontally beneath the vat and utilizing the lower wall thereof as one wall of the flue. In this manner it is possible to pre-heat the liquid within the vat prior to intimate contact of the heated air and products of combustion with the liquid. The flue 15 communicates with the passage way 16, through a vertical pipe 17.

Circulation through the flue and passage ways is completed to a condenser 18, which is disposed preferably at the end of the tank 10, adjacent the source of heated air. This condenser may be of any desired construction and is here shown as having an outer casing 19 enclosing cooling coils 20. The dome of the condenser is fitted with a pipe 21, leading outside or directly to a tank 22. The bottom of the condenser is provided with a perforated floor 23, through which the moisture laden air may pass and from which the concentrated solution may flow to the drip tank 24. This tank is in communication with the concentration tank 10, through a pipe 25. Regulation or discontinuance of the flow from one tank to the other is provided by a valve 26. All of the walls of the apparatus with which the solution comes into intimate contact are preferably covered with lead or other acid resisting material, so that there will be no possibility of corrosion or contamination of the liquid.

It is to be understood that the liquid may be heated in any desired manner either directly or indirectly, as for example, the heated air may be passed directly into the passage way 16, or the vat may be pre-heated by the method shown in the drawing, or by circulating tubes passing through the vat, and around which the liquid might stand.

In order to produce evaporation of the liquid, the vanes 27 are provided and are mounted upon a horizontal shaft 28. This shaft is free to rotate in a plane horizontal to the surface of the liquid within the tank, and is driven by a suitable transmission mechanism acting upon a pulley 29. The tips of the vanes are intended to pass through the liquid as the shaft rotates, thus making it possible for the vane to agitate the liquid and convert it into a fine spray which would be readily taken up by the heated air passing therethrough. In this connection it is to be understood that rotary disks or other members might be fastened upon shaft 28 and moved therewith to produce the desired agitation of the liquid, without departing from the spirit of the invention.

It will thus be seen that by the simple apparatus here disclosed, it is possible to rapidly evaporate non-volatile liquids and to insure that they might be concentrated to any desired strength by a simple and economical process.

While I have shown the preferred form of my invention as now known to me, it will be understood that various changes might be made in the combination and arrangement of parts by those skilled in the art, without departing from the spirit of the invention as claimed.

Having thus described my invention, what I claim and desire to secure by Letters Patent is:

1. An apparatus of the character described comprising a vat adapted to contain liquid to be concentrated, a flue extending horizontally beneath the vat whereby heated air may be employed to pre-heat liquid in the vat, a passageway formed above the vat and in communication with the said flue at one end of the vat whereby heated air and products of combustion passed through the flue for pre-heating the liquid may be directed across the top of the vat, a plurality of rotatable agitating members arranged across the top of the vat and adapted when rotated to project a spray of the liquid into passing heated air and products of combustion, and a heat exchanger arranged at one end of the vat in communication with said passageway for removing the concentrated solution from the heated air.

2. An apparatus of the character described comprising a comparatively shallow vat adapted to contain liquid to be concentrated, a liquid supply reservoir operatively connected to the vat, a flue extending horizontally beneath the vat and in communication with a furnace at one end whereby heated air and products of combustion may be directed through the flue beneath the vat for pre-heating liquid therein, a casing formed over the vat forming a passageway above the vat and in communication with the flue at one end of the vat whereby heated air and products of combustion directed through the flue will pass directly over the open top of the vat, a rotatable shaft arranged over the vat and having agitating members fixed thereon for agitating liquid in the vat and projecting a fine spray of the same into passing heated air and products of combustion, a heat exchanger arranged at one end and above said passageway and having a perforated bottom to permit heated air laden with moisture from the vat to pass into the exchanger for removing the concentrated solution from the heated air.

3. An apparatus of the character described comprising a comparatively shallow vat adapted to contain liquid to be concentrated, a liquid supply reservoir operatively connected to the vat, a flue extending horizontally beneath the vat and in communication with a forge at one end whereby heated air and products of combustion may be directed through the flue beneath the vat for preheating liquid therein, a casing formed over the vat forming a passageway above the vat and in communication with the flue at one end of the vat whereby heated air and products of combustion directed through the flue will pass directly over the open top of the vat, a rotatable shaft arranged over the vat and having agitating members fixed thereon for agitating liquid in the vat and projecting a fine spray of the same into passing heated air and products of combustion, a heat exchanger arranged at one end and above said passageway and having a perforated bottom to permit heated air laden with moisture from the vat to pass into the exchanger for removing the concentrated solution from the heated air, a drip tank arranged below the heat exchanger for receiving the concentrated solution from the same, and a pipe connection between said drip tank and the vat whereby the concentrated solution may be passed again to the vat for further concentration.

4. An apparatus of the character described comprising a vat adapted to contain liquid to be concentrated, a flue extending horizontally beneath the vat whereby heated air may be employed to pre-heat liquid in the vat, a passageway formed above the vat and in communication with the said flue at one end of the vat whereby heated air and products of combustion passed through the flue for preheating the liquid may be directed across the top of the vat, a plurality of rotatable agitating members arranged across the top of the vat and adapted when rotated to project a spray of the liquid into passing heated air and products of combustion, a heat exchanger arranged at one end of the vat in communication with said passageway for removing the concentrated solution from the heated air, a drip tank for receiving the concentrated solution from the heat exchanger, and a pipe connection between said tank and the vat whereby the concentrated solution may be passed again to the vat for further concentration.

ENRIQUE G. WILLEMS.